Patented June 24, 1930

1,765,748

UNITED STATES PATENT OFFICE

MERWYN C. TEAGUE, OF JACKSON HEIGHTS, NEW YORK, ASSIGNOR TO AMERICAN RUBBER COMPANY, OF BOSTON, MASSACHUSETTS, A CORPORATION OF MASSACHUSETTS

MANUFACTURE OF FLOOR COVERINGS AND PRODUCTS OBTAINED THEREBY

No Drawing.   Application filed April 4, 1925. Serial No. 20,680.

This invention relates to a method of preparing a floor covering and to the product thus prepared.

Rubber floorings have been made heretofore either as rubber blocks or tiles, or as rubber coatings on a fabric base. In both instances the floorings are made up by first compounding ordinary rubber and then calendering the compounded rubber into the desired form, which operation may or may not be followed by molding or pressing or coating. By reason of the number of operations required to prepare such flooring materials, the latter are relatively expensive. On the other hand cheap floorings of the linoleum type have been made, from a dry granular raw material, the final product being printed or not as desired. Other floor coverings are manufactured by printing designs on a base material, the wearing surface of which is composed of a linseed oil base. In this type of flooring the base material is coated with a solid colored, or "neutral" linseed oil base compound. Floorings made by such methods require much time and considerable equipment in order to obtain the necessary hardening of the oil compounds. The linoleum types of flooring possess a disadvantage in that they are not highly flexible, and it is well known that they frequently crack when they are handled.

The present invention relates to a floor covering which is inexpensive and easy to manufacture. It also relates to the preparation of floorings which do not crack easily when handled, are easily cleaned, have good wearing properties, and furnish a comfortable tread. It also has for its object a floor covering composed of a base material, and a surface coating of a rubber compound. Another object of the invention is the preparation of a rubberized flooring which has a fibrous base such as asphalt treated paper. Still another object of the invention is to produce a rubberized flooring of low material cost and of high resistance to abrasion. The invention includes the preparation of a flooring which is easily cleaned, and is not harmed by soap solutions. With a particular method in mind but without intention to limit the invention beyond what may be required by the prior art, the invention briefly stated consists in coating a flexible-asphalt-treated sheet material with a compounded aqueous dispersion of rubber, and drying the rubber coating. It also consists in coating an asphalt-treated paper or other sheet with a compounded aqueous dispersion of rubber, and drying the rubber compound so applied, the base material having impressed in its surface granular particles. The invention also consists in coating a fibrous base material with a compound adapted to form a bond between itself and the rubber coating which is applied thereto.

As an example of the invention, an asphalt-treated paper, such as what is known as tar paper, is used as the base material. This base material is coated with a compound containing 100 parts dry rubber (as latex containing 60% total solids).
100 parts ground flint (140 mesh).
100 parts gilder's whiting.
2 parts zinc oxide.
2 parts sulphur.
2 parts zinc dimethylaminodithiocarbamate.
5 parts red oxide.
10 parts mapico yellow.
5 parts casein.
25 parts ammonium hydroxide (28%).
0.5 part lampblack.
75 parts water (in addition to that in latex).
15 parts litharge.

In preparing this compound the ground flint, gilder's whiting, zinc oxide, sulphur, zinc dimethylaminodithiocarbamate, red oxide, mapico yellow, lampblack and litharge are mixed intimately and then the additional water added. This paste is then passed preferably through a paste or paint mill to remove all possible lumps. The casein is dissolved in the ammonia and then added to the latex. The paste of the compounding ingredients is then stirred into the latex-casein mix. This compound is spread over the base material and then dried and vulcanized if desired.

In the above example the asphalt paper base material may be substituted by suitable grades of burlap or other fabrics may be employed. Likewise the base material may comprise asphalt treated paper which has further been coated with an additional layer of asphalt with or without a coating of granular cork, slate, ground glass, porcelain or other coarse granules.

The compounding ingredients may also be varied. The gilder's whiting mentioned in the formula may be substituted in whole or in part by clays, barytes, ground slate, etc., the amount to be used being dependent upon the maximum quantity which can be incorporated without causing cracking during the drying operation.

Inasmuch as relatively thick layers of this and similar compounds must be spread at one time it is quite essential that the compound be so balanced and possess such a structure as to eliminate the possibility of cracking. The addition of the ground flint serves this purpose. It can, however, be replaced by coarse burnt clays and similar materials. It is sometimes desirable to stiffen and shorten the compounds by the addition of asbestine as well as China clay mentioned above. Similarly this result may be obtained in the dark compounds to some extent by increasing the amount of lampblack. The lampblack may be replaced by carbon black. Likewise it may be eliminated by adjusting the amount of litharge which serves as a black pigment after reacting to form its sulphide. Lithopone and zinc oxide some times are used to partially or completely replace gilder's whiting; this is particularly true in the white compounds. Zinc dimethylaminodithiocarbamate is used to permit rapid and low temperature curing thereby making only partial vulcanization necessary while the flooring is festooned in the heaters. Other low temperature curing agents may be employed. Ammonium methylphenyldithiocarbamate in fact is frequently used in order to further reduce the material cost. Red oxide, mapico yellow and lampblack are here used to produce the brown color. They may be varied in amount or completely replaced by RM green or other pigments. While the litharge also aids in adjusting the color its chief use here is that of thickening and stabilizing the compound. By stabilizing is meant, thickening the compound and maintaining the increased thickness without coagulation. Casein serves the same purpose. These may be varied in amounts or replaced by other thickeners and stabilizers. Oils such as paraffin or spindle oil or other softeners may be incorporated in the form of emulsions where softer compounds are desired.

Where the base material is previously coated with coarse granules, it is important that the rubber dispersion contain some substance or substances which will form a strong and lasting union between the granular materials and itself. Such union can be obtained by introducing into the rubber dispersion a material which will readily wet and penetrate somewhat into the surface of the granules, and at the same time will be soluble in or firmly attached to the rubber. The so-called polar compounds such as sulphonated cottonseed oil, sulphonated olive oil, sulphonated arachis oil, ortho toluidine, sodium sulphanilite, sodium salicylate, thiourea, potassium oleate are described in my copending Serial No. 737,597, filed Sept. 13, 1924. In this case sulphonated castor oil or other soluble oil may be employed to advantage. These compounds act as bonding ingredients between the base material and the rubber compound.

It may be desirable, when such granular surfaced base materials are used, to modify the rubber composition in order that it may possess the necessary low stretch and proper toughness in regard to abrasion, and yet retain sufficient elasticity to permit the finished flooring to be rolled easily and yet not to allow the granules to become loosened. A suitable composition is as follows:

100 parts rubber as latex.
100 parts ground flint.
50 parts gilder's whiting.
75 parts lithopone.
25 parts zinc oxide.
15 parts Montan wax.
5 parts casein (as ammonium caseinate).
2 parts sulphur.
1 part zinc dimethylaminodithiocarbamate.
20 parts sulphonated castor oil.
5 parts Karaya gum.

The compound is spread over the granular surfaced base material and allowed to dry either at room temperature or at elevated temperature, after which vulcanization can be completed by further heating. By balancing the amounts of vulcanizing ingredients, the vulcanization can be accomplished within a comparatively short time. The above compound after drying will be completely vulcanized in 1–1½ hrs. at about 212° F.

Various colors may be produced and the filling ingredients may be substituted as in the previous examples. The polar compound or contact agent may be varied, depending upon the nature of the granules which are distributed upon the base material. Under some conditions it may be desirable to give the base material a previous spraying or coating of a suitable contact agent prior to the treatment with the compounded dispersion of rubber.

Many designs may be made by using different colored granules or pebbles with a rubber matrix of a given color or by using granules of one color and a rubber matrix or matrices of different colors. The surface of the flooring after vulcanization may be buffed to increase its smoothness, and it may be polished if desired.

In either of the above examples, but particularly in the first example of the ordinary tar paper base material, it may be desirable to use an intermediate compound which is adapted to bridge across the difference in properties of the asphalt base and the rubber compound. The natural material to use with the rubber would be asphalt, tar, or such similar material, but this is frequently undesirable on account of the color thus imparted to the rubber dispersion. An intermediate compound may be prepared with cumar or similar resins such as those described in my copending application Serial No. 738,553, filed September 18, 1924. As a specific example 100 parts of rubber in the form of latex, 100 parts of gilder's whiting, and 100 parts of cumar resin as a water emulsion is quite satisfactory. The whiting may be replaced by other inert compounding ingredients or may be varied in amount. The cumar may be emulsified in any suitable manner and may be used in varying amounts, and either partially or entirely replaced by other similar resins of tars provided the desired color of the resultant flooring will not be unduly affected.

The base material referred to as asphalt treated sheet material is meant to include what is generally known as tar paper, asphalt felted roofing, and other similar impregnated fibrous roofings, with or without surfaces composed of granules of stone, cork, etc.

Having thus described my invention, what I claim and desire to protect by Letters Patent is:

1. Flooring comprising a fibrous base material and a surfacing of a dried compounded rubber dispersion containing a polar compound.

2. Flooring comprising a fibrous base material and a surfacing of a dried compounded rubber latex containing a polar compound adapted to assist in forming a bond between said base material and the rubber compound.

3. Flooring comprising a flexible fibrous base material and a surfacing of a dried compounded aqueous dispersion of rubber containing a polar compound.

4. As an article of manufacture a flooring comprising an asphalted base material carrying a surfacing embodying dried rubber latex united to said material by the assistance of a polar compound.

5. As an article of manufacture a flooring comprising a flexible fibrous base material having a surfacing embodying dried and vulcanized rubber latex securely joined thereto through the agency of a polar compound.

6. As an article of manufacture a flooring comprising asphalted fibrous material and a surfacing of a dried and vulcanized compounded rubber latex containing a polar compound.

7. As an article of manufacture a flooring comprising flexible base material coated with granules and a vulcanized rubber compound containing material having a tendency to wet the rubber, granules and base material.

8. In preparing rubber coated asphalt-treated fibrous materials, the step of distributing granular materials on a fibrous base material prior to treatment with rubber dispersion and treating said fibrous material with a stabilized thickened compounded rubber dispersion containing a polar compound adapted to increase the bond between the fibrous material and the rubber dispersion.

9. In preparing rubber coated asphalt-treated fibrous material, the step of distributing granular materials on a fibrous base material prior to treatment with a rubber dispersion, bonding said granules in the base material by partially submerging them therein, and treating said fibrous material with a stabilized thickened compounded rubber dispersion containing a polar compound adapted to increase the bond between the fibrous material and the rubber dispersion.

10. A method of making sheet material comprising applying an uncoagulated compounded dispersion of rubber containing a polar compound to a flexible fibrous backing, drying, and vulcanizing.

11. A method of making sheet material comprising applying an uncoagulated compounded rubber latex containing a polar compound to a fibrous backing treated with an asphaltic material.

12. A method of making sheet material comprising embedding granular material in a fibrous backing treated with an asphaltic material, and uniting a surfacing of a rubber latex compound to the backing and granular material by the aid of a polar compound.

Signed at New York, county of New York, State of New York, this 31st day of March, 1925.

MERWYN C. TEAGUE.